US012249063B1

(12) United States Patent
Jackson et al.

(10) Patent No.: US 12,249,063 B1
(45) Date of Patent: Mar. 11, 2025

(54) SYSTEM AND METHOD FOR PROVIDING A RAPID VIRTUAL DIAGNOSTIC COMPANION FOR USE IN DIAGNOSIS OF CANCER AND RELATED CONDITIONS USING IMMUNOHISTOCHEMISTRY BASED UPON A NEURAL NETWORK

(71) Applicant: Dartmouth-Hitchcock Clinic, Lebanon, NH (US)

(72) Inventors: Christopher R. Jackson, White River Junction, VT (US); Louis J. Vaickus, Etna, NH (US)

(73) Assignee: Dartmouth-Hitchcock Clinic, Lebanon, NH (US)

( * ) Notice: Subject to any disclaimer, the term of this patent is extended or adjusted under 35 U.S.C. 154(b) by 298 days.

(21) Appl. No.: 17/073,123

(22) Filed: Oct. 16, 2020

Related U.S. Application Data

(60) Provisional application No. 62/916,178, filed on Oct. 16, 2019.

(51) Int. Cl.
*G06T 7/00* (2017.01)
*G06T 7/11* (2017.01)

(52) U.S. Cl.
CPC .............. *G06T 7/0012* (2013.01); *G06T 7/11* (2017.01); *G06T 2207/10024* (2013.01);
(Continued)

(58) Field of Classification Search
CPC . G06T 2207/30024; G06T 2207/20081; G06T 7/0014; G06V 20/69
See application file for complete search history.

(56) References Cited

U.S. PATENT DOCUMENTS

2005/0266395 A1* 12/2005 Gholap ................. G06T 7/0012
702/19
2008/0032328 A1* 2/2008 Cline ....................... G06T 7/35
382/128
(Continued)

FOREIGN PATENT DOCUMENTS

WO 2010049651 5/2010
WO 2018052587 3/2018
(Continued)

OTHER PUBLICATIONS

Chen et al., "Double staining immunohistochemistry", North American Journal of Medical Sciences, May 2010, vol. 2, No. 5, www.najms.org, 5 pages.
(Continued)

*Primary Examiner* — Gandhi Thirugnanam
(74) *Attorney, Agent, or Firm* — Loginov & Associates, PLLC; William A. Loginov

(57) ABSTRACT

This provides a system and method for analyzing and diagnosing conditions, such as cancer, based upon stained tissue sample slides prepared by users from patient tissue taken, for example, in a biopsy procedure. A convolutional neural network (CNN) is generated at training time. Slide images are acquired/scanned, and individual cell nuclei from the images are annotated, using IHC. H&E images are acquired/scanned prior to a washout intermediate step from the same slides/tissue samples. IHC is performed on the same tissue layer, which was scanned and used to retrospectively annotate the H&E WSI. IHC is used to annotate a ground truth mask for machine learning. The resultant process achieves a high degree of spatial resolution in detecting individual IHC positive nuclei, yielding process that is almost entirely automated, employing materials that
(Continued)

are commonly available in clinical practice. In runtime, users access the CNN to perform analysis on patient slides.

20 Claims, 9 Drawing Sheets

(52) U.S. Cl.
CPC ............... *G06T 2207/20081* (2013.01); *G06T 2207/20084* (2013.01); *G06T 2207/30024* (2013.01)

(56) References Cited

U.S. PATENT DOCUMENTS

| | | | | |
|---|---|---|---|---|
| 2012/0076390 | A1* | 3/2012 | Potts | G06T 7/38 382/133 |
| 2014/0270457 | A1* | 9/2014 | Bhargava | G06V 20/69 382/133 |
| 2015/0356342 | A1* | 12/2015 | Kato | G06V 10/776 382/133 |
| 2016/0253466 | A1* | 9/2016 | Agaian | G16Z 99/00 382/128 |
| 2017/0161891 | A1* | 6/2017 | Madabhushi | G06V 10/82 |
| 2017/0309021 | A1* | 10/2017 | Barnes | G06T 7/0012 |
| 2017/0323431 | A1* | 11/2017 | Sarkar | G06T 7/0014 |
| 2017/0337695 | A1* | 11/2017 | Sarkar | G06V 20/69 |
| 2019/0025773 | A1* | 1/2019 | Yang | G06K 9/6256 |
| 2019/0087954 | A1* | 3/2019 | Lloyd | G06V 20/698 |
| 2019/0156159 | A1* | 5/2019 | Kopparapu | G16H 30/40 |
| 2019/0258984 | A1* | 8/2019 | Rehman | G06N 3/08 |
| 2019/0347557 | A1* | 11/2019 | Khan | G06N 3/0481 |
| 2020/0250817 | A1* | 8/2020 | Leng | G16H 30/20 |
| 2020/0372235 | A1* | 11/2020 | Peng | G01N 1/30 |
| 2020/0394825 | A1* | 12/2020 | Stumpe | G06V 10/82 |
| 2021/0064845 | A1* | 3/2021 | Stumpe | G06V 20/695 |
| 2021/0073986 | A1* | 3/2021 | Kapur | G06V 10/255 |

FOREIGN PATENT DOCUMENTS

| | | |
|---|---|---|
| WO | 2018155898 | 8/2018 |
| WO | 2019055555 A1 | 3/2019 |

OTHER PUBLICATIONS

Irshad et al. "Methods for Nuclei Detection, Segmentation, and Classification in Digital Histopathology: A Review-Current Status and Future Potential", IEEE Reviews in Biomedical Engineering, vol. 7, 2014, pp. 97-114.

Odell et al., "Immunofluorescence Techniques", Journal of Investigative Dermatology, www.jidonline.org, 2012, 133, doi: 10.1038/jid.2012.455.

Kivity et al., "A novel automated indirect immunofluorescence autoantibody evaluation", Clin Rheumatol 2012, 31 503-509.

Kumar et al., "A Dataset and a Technique for Generalized Nuclear Segmentation for Computational Pathology", 2016, IEEE Transactions on Medical Imaging, DOI 10.1109/TMI.2017.2677499, 11 pages.

Chen et al., "DCAN: Deep contour-aware networks for object instance segmentation from histology images", Medical Image Analysis 36 (2017) 135-146.

Malon et al., "Classification of mitotic figures with convolutional neural networks and seeded blob features", J Pathol Inform, 2013, 2:9, http://www.jpathinformatics.org/text.asp?2013/4/1/9/112694.

Xu et al., "Automatic Nuclear Segmentation Using Multi-scale Radial Line Scanning with Dynamic Programming", Journal of Latex Class Files, vol. 11, No. 4, Dec. 2012.

Rouhi et al., "Benign and malignant breast tumors classification based on region growing and CNN segmentation", Expert Systems with Applications 42 (2015) 990-1002.

Xie et al., "Beyond Classification: Structured Regression for Robust Cell Detection Using Convolutional Neural Network", Med Image Comput Comput Assist Interv. Oct. 2015 ; 9351: 358-365.

Song et al., "A Deep Learning Based Framework for Accurate Segmentation of Cervical Cytoplasm and Nuclei", IEE Eng Med Biol Soc 2014, pp. 2903-2906.

Olsen et al., "Diagnostic Performance of Deep Learning Algorithms Applied to Three Common Diagnoses in Dermatophathology", Journal of Pathology Informatics 2018, 1:32.

Cruz-Roa et al., "A Deep Learning Architecture for Image Representation, Visual Interpretability and Automated Basal-Cell Carcinoma Cancer Detection", MICCAI 2013, Part II, LNCS 8150, pp. 403-410.

Cruz-Roa et al., "Automatic detection of invasive ductal carcinoma in whole slide images with Convolutional Neural Networks", Medical Imaging 2014, 15 pages.

Albarqouni et al., "AggNet: Deep Learning From Crowds for Mitosis Detection in Breast Cancer Histology Images", IEEE Transactions on Medical Imaging, vol. 35, No. 5, May 2016, pp. 1313-1321.

Araujo et al., "Classification of breast cancer histology images using Convolutional Neural Networks", PLOS One, 2017, 14 pages.

Marsh et al., "Deep Learning Global Glomerulosclerosis in Transplant Kidney Frozen Sections", IEEE Trans Med Imaging. Dec. 2018; 37(12): 2718-2728. doi:10.1109/TMI.2018.2851150.

Coudray et al., "Classification and Mutation Prediction from Non-Small Cell Lung; Cancer Histopathology Images using Deep Learning", Not Med 2018, 1559.

Sirinukunwattana et al., "Locality Sensitive Deep Learning for Detection and Classification of Nuclei in Routine Colon Cancer Histology Images", IEEE, Feb. 2016, 13 pages.

Sharma et al., "Deep convolutional neural networks for automatic classification of gastric carcinoma using whole slide images in digital histopathology", Computerized Medical Imaging and Graphics 61 (2017) 2-13.

Xu et al., "A Deep Convolutional Neural Network for segmenting and classifying epithelial and stromal regions in histopathological images", Neurocomputing. May 26, 2016; 191: 214-223. doi:10.1016/j.neucom.2016.01.034.

Young Hwan Chang et al., "Deep Leaning based Nucleus Classification in Pancreas Histological Images", 2017 IEEE, pp. 672-675.

Burlingame et al., "SHIFT: speedy histopathological-to-immunofluorescent translation of whole slide images using conditional generative adversarial networks", Proc SPIE Int Soc Opt Eng. Feb. 2018; 10581; doi: 10.1117/12.2293249.

Lotz et al., "Patch-Based Nonlinear Image Registration for Gigapixel Whole Slide Images", 2015 IEEE, 10 pages.

Szegedy et al., "Rethinking the Inception Architecture for Computer Vision", CVPR 2016, pp. 2818-2826.

Serief et al., "Automatic Registrati on of Satellite Images", 2009 First International Conference on Advances in Satellite and Space Communications, pp. 85-89.

Dean et al., "An evaluation of four CT-MRI co-registration techniques for radiotherapy treatment planning of prone rectal cancer patients", The British Journal of Radiology, 85 (2012), 61-68.

\* cited by examiner

SYSTEM AND METHOD FOR PROVIDING A RAPID VIRTUAL DIAGNOSTIC COMPANION FOR USE IN DIAGNOSIS OF CANCER AND RELATED CONDITIONS USING IMMUNOHISTOCHEMISTRY BASED UPON A NEURAL NETWORK

RELATED APPLICATION

This application claims the benefit of U.S. Patent Provisional Application Ser. No. 62/916,178, entitled SYSTEM AND METHOD FOR PROVIDING A RAPID VIRTUAL DIAGNOSTIC COMPANION FOR USE IN DIAGNOSIS OF CANCER AND RELATED CONDITIONS USING IMMUNOHISTOCHEMISTRY BASED UPON A NEURAL NETWORK, filed Oct. 16, 2019, the teachings of which are expressly incorporated herein by reference.

FIELD OF THE INVENTION

This invention relates to surgical pathology and diagnosis of conditions, such as cancer (e.g. melanoma), neoplasia, or other medical diseases, and more particularly to computerized systems and methods for performing such diagnosis based upon immunohistochemistry or other chromogenic stains.

BACKGROUND OF THE INVENTION

Immunohistochemistry (IHC) is a diagnostic technique applied to formalin-fixed paraffin-embedded tissue. In this technique, antibodies are used to localize a color-producing histochemical reaction to the site of a specific antigen. This allows for the graphical detection and reporting of that antigen within lesions under diagnostic evaluation. Although the technique is time-consuming, costly, is typically limited to detecting only one-to-three antigens at a time in the clinical setting, and requires specialized equipment and laboratory expertise to perform, it is ubiquitously used in the field of anatomic pathology to aid in the diagnosis of both benign and malignant lesions and conditions.

Accurate quantitation of histopathology by neural networks has proved challenging. The ability to automatically sort individual cells in digital pathology images is expected to play an important role in cellular quantification and analytical tasks. It currently relies largely on segmentation and Region of Interest algorithms. Early efforts that attempted to segment cells in hematoxylin and eosin (H&E) images used classic computational techniques such as gradient detection, morphological watersheds, geometric techniques, and combinations thereof. See by way of background information, Chen X, Cho D-B, Yang P-C. Double staining immunohistochemistry. N. Am. J. Med. Sci. 2010; 2:241. doi:10.4297/NAJMS.2010.2241; Irshad H, Veillard A, Roux L, et al. Methods for Nuclei Detection, Segmentation, and Classification in Digital Histopathology: A Review-Current Status and Future Potential. IEEE Rev. Biomed. Eng. 2014; 7:97-114. doi:10.1109/RBME.2013.2295804; Odell I D, Cook D. Immunofluorescence Techniques. J. Invest. Dermatol. 2013:4. doi:10.1038/jid.2012.455; and Kivity S, Gilburd B, Agmon-Levin N, et al. A novel automated indirect immunofluorescence autoantibody evaluation. Clin. Rheumatol. 2012; 31:503-509. doi:10.1007/s10067-011-1884-1.

Although the above-referenced techniques perform adequately in isolated cases, they required uniform and distinguishable colors and textures, and performed poorly in challenging cases See Kumar N, Verma R, Sharma S, Bhargava S, Vahadane A, Sethi A. A Dataset and a Technique for Generalized Nuclear Segmentation for Computational Pathology. IEEE Trans Med Imaging. 2017; 36: 1550-1560. With the development of machine learning, efforts have been focused on using convolutional neural networks (CNNs) to perfectly segment the nuclei and cytoplasmic borders of individual cells. See for background, Chen H, Qi X, Yu L, Dou Q, Qin J, Heng P-A. DCAN: Deep contour-aware networks for object instance segmentation from histology images. Med Image Anal. 2017; 36: 135-146. To attain an adequate performance, networks are thereby trained on image datasets that consisted of tens of thousands of manually annotated images. Disadvantageously, this labor-intensive approach is highly time consuming. Despite efforts to produce generalizable datasets, challenging cases with overlapping nuclei and variable chromatin density often yielded poor results. Seeding techniques have also been developed to accurately count and localize cells using a faster annotation process. See for background, Malon C D, Cosatto E. Classification of mitotic figures with convolutional neural networks and seeded blob features. J Pathol Inform. 2013; 4:9. In these techniques, a CNN is trained to recognize the center of the nucleus which is annotated with a single dot. See, by way of example, Malon C D (referenced above); Xu H, Lu C, Berendt R, Jha N, Mandal M. Automatic Nuclear Segmentation Using Multiscale Radial Line Scanning With Dynamic Programming. IEEE Trans Biomed Eng. 2017; 64: 2475-2485; and Rouhi R, Jafari M, Kasaei S, Keshavarzian P. Benign and malignant breast tumors classification based on region growing and CNN segmentation. Expert Syst Appl. 2015; 42: 990-1002. By doing so, the network generally exhibits satisfactory performance across multiple tissue types, even in challenging cases with overlapping cells. In an early study, one model achieved a positive predictive value and sensitivity of 0.864 and 0.906, respectively. See Xie Y, Xing F, Kong X, Su H, Yang L. Beyond Classification: Structured Regression for Robust Cell Detection Using Convolutional Neural Network. Med Image Comput Assist Interv. 2015; 9351: 358-365.

In addition to identifying individual nuclei, CNNs have been used to classify larger regions of interest by tissue type and diagnosis. Such networks required annotated image sets that functioned as ground truth masks. Several methods have been used to generate such annotations, but supervised learning methods using pathologist-label images is common. Such methods have already been used in cervical cancer [See, Song Y, Zhang L, Chen S, Ni D, Li B, Zhou Y, et al. A deep learning based framework for accurate segmentation of cervical cytoplasm and nuclei. Conf Proc IEEE Eng Med Biol Soc. 2014; 2014: 2903-2906.], skin lesions [See, Olsen T G, Jackson B H, Feeser T A, Kent M N, Moad J C, Krishnamurthy S, et al. Diagnostic Performance of Deep Learning Algorithms Applied to Three Common Diagnoses in Dermatopathology. J Pathol Inform. 2018; 9: 32; and Cruz-Roa A A, Arevalo Ovalle J E, Madabhushi A, Gonzilez Osorio F A. A deep learning architecture for image representation, visual interpretability and automated basal-cell carcinoma cancer detection. Med Image Comput Comput Assist Interv. 2013; 16: 403-410.], breast cancer [See, Cruz-Roa A, Basavanhally A, González F, Gilmore H, Feldman M, Ganesan S, et al. Automatic detection of invasive ductal carcinoma in whole slide images with convolutional neural networks. Medical Imaging 2014: Digital Pathology. 2014. doi:10.1117/12.2043872; Albarqouni S, Baur C, Achilles F, Belagiannis V, Demirci S, Navab N. AggNet: Deep Learning From Crowds for Mitosis Detection in Breast Cancer Histology Images. IEEE Trans Med Imaging. 2016; 35: 1313-1321; and Araújo T, Aresta G, Castro E, Rouco J, Aguiar P, Eloy C, et al. Classification of breast cancer histology images using Convolutional Neural Networks. PLoS One. 2017; 12: e0177544.], kidneys [See, Marsh J N, Matlock M K, Kudose S, Liu T-C, Stappenbeck T S, Gaut J P, et al. Deep Learning Global Glomerulosclerosis in Transplant Kidney Frozen Sections. IEEE Trans Med Imaging. 2018; 37: 2718-2728.], lungs [See Coudray N, Ocampo P S, Sakellaropoulos T, Narula N, Snuderl M, Fenyö D, et al. Classification and mutation prediction from non-small cell lung cancer histopathology images using deep learning. Nat Med. 2018; 24: 1559-1567.], and colon cancers [See Sirinukunwattana K, Ahmed Raza S E, Yee-Wah Tsang, Snead D R J, Cree I A, Rajpoot N M. Locality Sensitive Deep Learning for Detection and Classification of Nuclei in Routine Colon Cancer Histology Images. IEEE Trans Med Imaging. 2016; 35: 1196-1206]. However, despite its popularity, the process of employing a CNN in any of the above-described arrangements has disadvantages in that it is still time-intensive, and susceptible to human bias.

An alternative to using pathologist-labelled training images is unsupervised learning, where images are labelled using objective data (e.g. IHC, serological and molecular assays). One such technique is immunohistochemical staining performed on one tissue layer to annotate the H&E image created from the adjacent tissue layer. See, by way of background information, Sharma H, Zerbe N, Klempert I, Hellwich O, Hufnagl P. Deep convolutional neural networks for automatic classification of gastric carcinoma using whole slide images in digital histopathology. Comput Med Imaging Graph. 2017; 61: 2-13; and Xu J, Luo X, Wang G, Gilmore H, Madabhushi A. A Deep Convolutional Neural Network for segmenting and classifying epithelial and stromal regions in histopathological images. Neurocomputing. 2016; 191: 214-223. This technique has the advantage of using data which is already available from clinical practice. In addition, the annotation is inherently unbiased, and the process can easily be automated. Using the subsequent tissue layer, however, does not yield precise cell-specific classification. Such classification may be vital in cases of microinvasion, micrometastasis, mixed cell populations, and lesions where individual cell immunophenotype is vital to the diagnosis. Moreover, as this technique cannot classify individual cells, it cannot accurately quantify lesional cells or perform cell-specific analytical tasks that may one day be useful in cancer staging and prognostication. See for background, Amin M B, Edge S B, Greene F L, Byrd D R, Brookland R K, Washington M K, et al. AJCC Cancer Staging Manual. Springer; 2018. To circumvent these problems, techniques have been developed wherein H&E whole slide images (WSI) are annotated by performing immunofluorescence on the same cell layer. See for background, Young Hwan Chang, Thibault G, Madin O, Azimi V, Meyers C, Johnson B, et al. Deep learning based Nucleus Classification in pancreas histological images. Conf Proc IEEE Eng Med Biol Soc. 2017; 2017: 672-675; and Burlingame E A, Margolin A A, Gray J W, Chang Y H. SHIFT: speedy histopathological-to-immunofluorescent translation of whole slide images using conditional generative adversarial networks. Proc SPIE Int Soc Opt Eng. 2018; 10581. doi: 10.1117/12.2293249. These techniques achieve a 94.5% pixel-wise accuracy when using cytokeratin and smooth muscle actin markers in pancreatic tissue. Despite their success, immunofluorescence is not commonly used to classify immunophenotype in the clinical setting, undergoes a loss of signal over time when exposed to light, requires specialized equipment to perform—which may be unavailable in various facilities, or in isolated/underdeveloped regions, and is subject to considerable variation between different runs and different analyzing laboratories. Moreover, such studies do not comprehensively characterize their training and testing sets. Such characterization is needed if the technique is to be generalized and used in the clinical setting. In a separate study, phosphohistone-H3 immunohistochemistry was performed on the same tissue layer as an H&E stain following a de-staining procedure. See, i.e., Kumar N, referenced above. After a two-step quasi-manual registration step, this technique was successfully able to use the IHC to annotate mitotic figures within a cohort of breast cancer cases.

It is desirable to provide a system and method that can employ an automatically trained CNN to analyze stained slides free of the need for specialized and potentially unavailable lab equipment and/or techniques; and to provide a high degree of accuracy in any resulting analysis/diagnosis.

SUMMARY OF THE INVENTION

This invention overcomes disadvantages of the prior art by providing a system and method for providing a computerized, rapid, virtual diagnostic companion, used by practitioners in analyzing and diagnosing conditions, such as cancer, based upon stained tissue sample slides prepared by users from patient tissue taken, for example, in a biopsy procedure, fluid washing, mucosal scraping, fine needle aspiration, surgical excision, or tissue culture. A convolutional neural network (CNN) is generated from the image data at training time. More particularly, images are taken, using microscopic image acquisition devices of the slides, and individual melanocyte nuclei from the tissue sample are annotated using (e.g.) SOX10 IHC. H&E (for example) images are acquired/scanned, prior to a washout (de-staining) intermediate step, from the same slides/tissue samples. SOX10 IHC, or a different chromogenic stain, is then performed on the same tissue layer, which was acquired/scanned, and used to retrospectively annotate the H&E WSI. IHC or the chromogenic stain is used to annotate a ground truth mask for machine learning. The resultant process achieves a high degree of spatial resolution in detecting individual SOX10 positive nuclei, and allows for a process that is almost entirely automated, employing materials that are commonly available in clinical practice. In a subsequent runtime process, users access the CNN to perform analysis on patient slides prepared using (e.g.) H&E staining.

In an illustrative embodiment, a system and method for providing a diagnostic companion for diagnosing conditions based upon microscopic analysis of cells in tissue sample slides is disclosed. A convolutional neural network CNN, running on a processor, is trained based upon images of a plurality of the tissue sample slides acquired using each of at least two preparation techniques. As such images are analyzed for training based upon a same tissue sample with each of the two preparation techniques, respectively. The (at least) two preparation techniques comprise H&E staining and IHC. However, more generally, the (at least) two preparations include IHC and at least one non-IHC stain selected from a group consisting of H&E, Dif Quik, Romanowsky stain, Papanicolaou stain, Periodic Acid Schiff, Gram stain, Trichrome stain, Colloidal Iron, Sudan Black, or any other specialized non-IHC stain. A segmentation process can be provided, which divides each of the images into regions of interest (ROIs). Illustratively, a registration process aligns image features in the image from the IHC technique (the IHC image) to the image from the H&E technique (the H&E image) in the same tissue sample. Additionally, a mask layer can be generated by applying (e.g.) color-thresholding, machine learning techniques, and/or other computational transformations to the registered IHC image to create the mask layer. An annotated H&E image can then be generated by annotating the H&E image with the mask layer to create sub images that comprise training set images. In exemplary embodiments, the CNN can be trained using the training set so as to predict IHC cellular staining (which can comprise SOX10 nuclear staining in a non-limiting example). Illustratively, the CNN comprises at least one of a VGG19-based neural network and InceptionV3-based neural network, but use of other commercially available and/or customized NNs or machine learning algorithms are expressly contemplated. A user interface can be provided, which enables a user to provide a stained slide with a tissue sample (e.g. an H&E-stained sample) for analysis and provision of diagnostic results by applying the CNN during runtime. The user interface can be associated with a remote network architecture that enables long distance input to, and receipt of results by, the user. It can be instantiated using any acceptable data handling modality—for example, a PC, laptop, tablet or smartphone. In illustrative embodiments, the results can include at least one of color-coding, graphics, statistical, and textual information. In various implementations, the CNN can be associated with a remote computing device with which the user is associated by at least one of a subscription, payment arrangement or organizational membership. The interface can further include an identification process to validate the user, secure channels, encryption, etc. In the above illustrative embodiment, the training of the CNN entails de-staining the non-IHC stain and applying IHC to the same slide with scanning/image acquisition before the de-staining process, and also after application of IHC to the de-stained slide.

BRIEF DESCRIPTION OF THE DRAWINGS

The invention description below refers to the accompanying drawings, of which.

DETAILED DESCRIPTION

I. System Overview

A. Hardware and Software Arrangement

Figure 1:
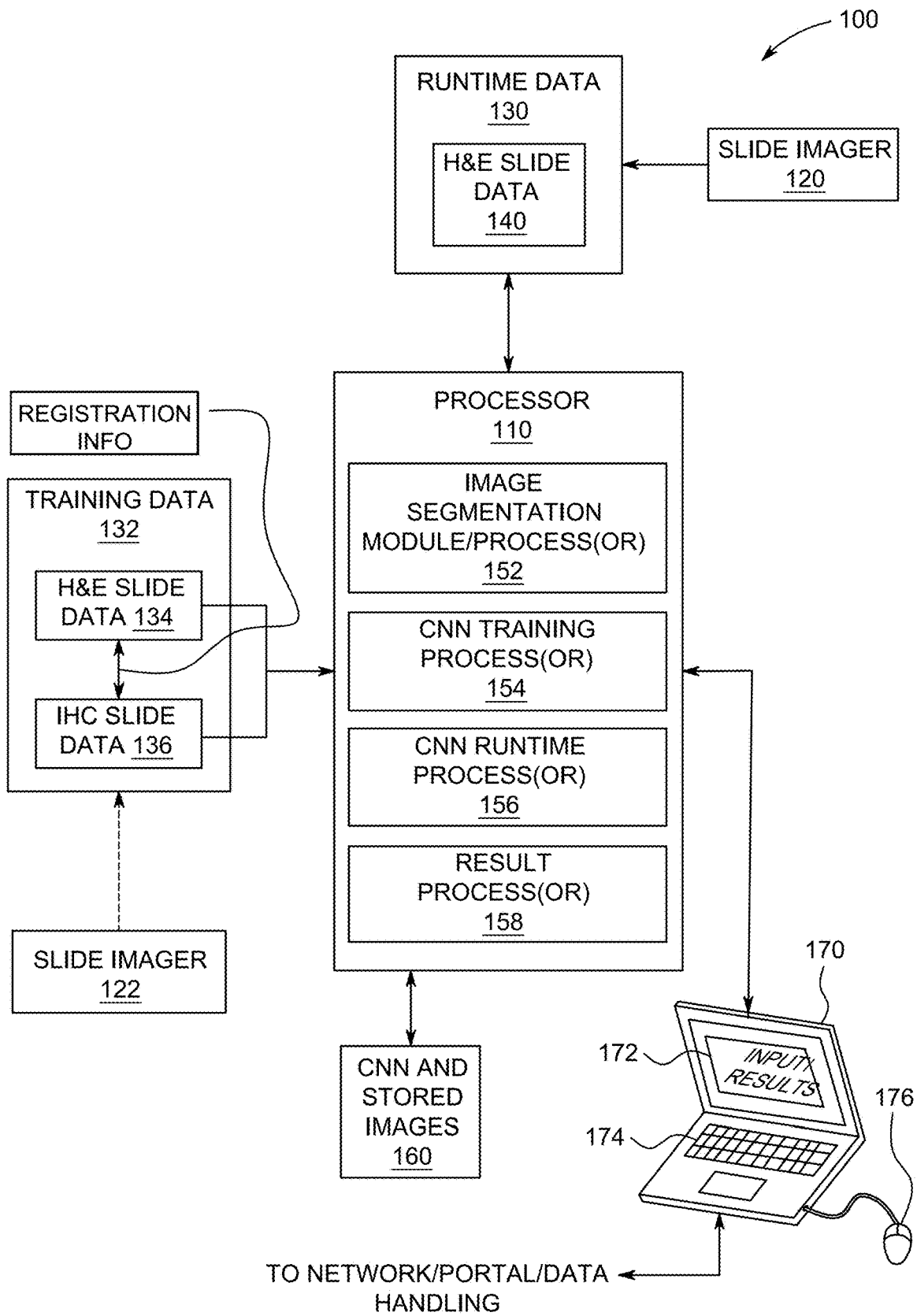
FIG. 1 is a schematic diagram of an overall hardware and software arrangement in which the illustrative system and method operates, according to an exemplary embodiment.

FIG. 1 shows an arrangement 100 for diagnosing conditions (e.g. various forms of cancer, including, but not limited to, melanoma) based upon tissue sample slides prepared from patient tissue as part of a treatment diagnosis and regime. The arrangement includes a computing processor 110 that can be acceptable system, such as a server, laptop, PC, cloud computing environment, etc. The processor 110 receives image data from a variety of sources, including, but not limited to one or more slide imagers 120, 122 that transform optical information from a part of, or whole, slides, via a microscope optics and associated image sensor, into digital image data in a desired format. As described further below, the slide imager 120 is used in the field to image patient slides for diagnosis in runtime, and this data 130 is thereby presented to the processor 110. The other slide imager 122 can be part of a system that produces a large volume of slide image data based upon various types of cells and/or conditions. This data 132 is part of a training set that is input to the processor 110 for use in construction a CNN as described further below. Note that the processor 110 is generally representative of one or more processing/computing devices that can be used in any of the stages of the overall system and method. In practice, one processor can be used to train the CNN, while another processor produces final images and even another is used to operate a runtime portal accessed by practitioners seeking to analyze one or more patient slides using the system and method. Hence, the term "processor" or "computing device" as used herein should be taken broadly to include one or more discrete processors/computing devices used at one or more stages of the over training and/or runtime operation of the system and method.

As also described below, the data 130, 132 can consist of images that constitute different staining techniques. In an example, a conventional H&E technique is used for slides provided in runtime slide data 140. For the training set 132, the slide data 134 is initially produced via H & E staining. These same slides are then distained using known techniques and the IHC technique is applied to the same set of slides, which are then reimaged by (e.g.) the imager 122 to produce an IHC set 136. The image data is acquired from both sets is correlated (using identifiers, flags, color filters, machine learning-based image transformations, etc.) so that H&E slides and IHC slides of the same tissue are mated together in the data set. The data in these slide pairs can then be aligned/registered by the processor as described below for comparison.

The processor 110 contains a plurality of functional processes(ors) or modules. There is an image segmentation module/process(or) 152 that allows both training and runtime slides to be broken into smaller feature sets for reduction in processing overhead and/or to identify specific conditions within the data. The segmentation can include a registration that is used at training time to align features in each type of slide in a pair-H&E and IHC. This can allow for comparison, as well as masking and other image overlay operations described below. A CNN training module/process (or) 154 controls the construction of the CNN 160, which is stored along with appropriate classifiers, image data, etc. as shown. Likewise, a CNN runtime module/process(or) 156 controls application of the CNN 160 to runtime data 130 to achieve diagnostic results. These results are handled by a result module/process(or) 158 that can present desired information graphically and/or textually as desired.

The process(or) 110 can be part of, or in communication with, a computing device 170, which as described below can be any acceptable computing device or group of computing devices. The computing device 170 can handle or manage system settings, user inputs and result outputs. The computing device 170 herein includes an exemplary graphical user interface (GUI) having a display (e.g. a touchscreen) 172, mouse 174 and keyboard 176. The computing device 170 can interface with various network asserts/data utilization devices, such as data storage, printers, display, robots, network ports, etc. Again, while the interface/display device (computing device 170) herein is shown as a standalone PC or laptop with separate keyboard and mouse, this can be representative of any acceptable platform for entering, receiving and manipulating information, including those with a single all-in-one functionality (e.g. a touchscreen display), such as found on a smartphone, tablet or miniaturized laptop.

B. Overall Operating Procedure

Figure 2:
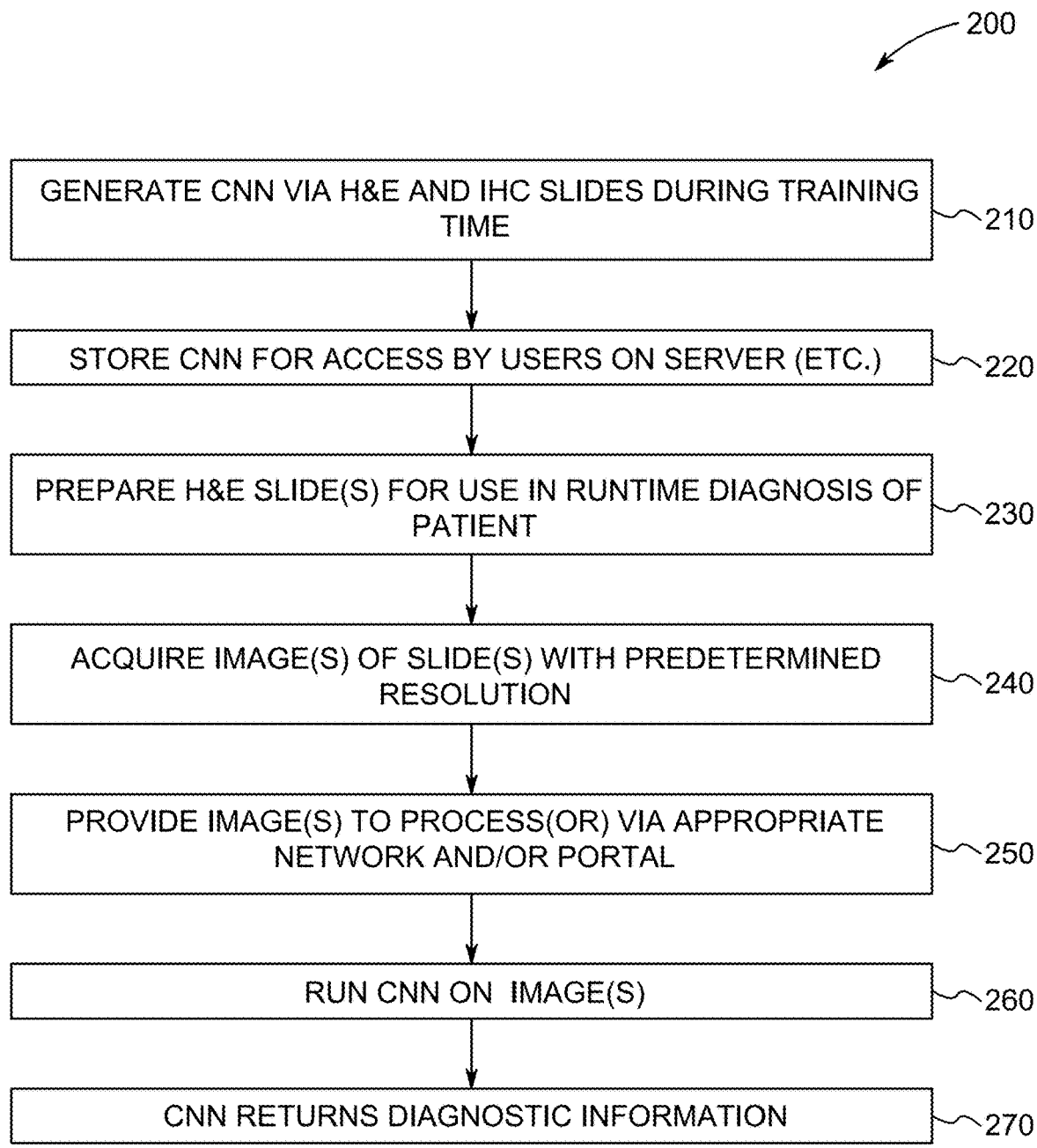
FIG. 2 is a flow diagram of an exemplary procedure for operating the system and method according to an exemplary embodiment.

FIG. 2 is a flow diagram showing an overall operational procedure 200 utilizing the arrangement 100 of FIG. 1. In general, the procedure entails a training process, to be described further below. The training process generates the CNN using a large volume of training slides according to step 210. The CNN and any associated image data is stored (step 220) with respect to the process(or) 110 for use in follow-on runtime operations. This trained CNN can also be termed herein a "virtual IHC" (vIHC) During runtime, the user (e.g. a medical practitioner) prepares one or more slides of the tissue of interest from a biopsy or other tissue/cell-gathering task. These slides are stained for contrast using (e.g.) the H&E procedure (step 230). In step 240, the slides are imaged, and such runtime image data is stored, using an appropriate imaging microscope system. In step 250, the images are provided via the user interface to the process(or). Then, in step 260, the trained CNN is run on the images to identify various trained features. This can include image segmentation as also described herein. Then, in step 260 diagnostic information is returned by the process(or) to the user in an appropriate format (or set of formats) via a user interface.

II. Exemplary Implementation

The following description relates to an exemplary implementation of the system and method herein, including experimental results.

A. Digital Slide Preparation

A database search was carried out for recent cases that had been stained with SOX10 IHC as part of their routine workup. Twelve tissue blocks from different cases were selected to span a variety of histological diagnoses and to maximize the overall tissue surface area. This final set of images (neural net (NN) set) consisted of eight invasive melanomas, two in-situ melanomas, one neuroma, and one pigmented basal cell carcinoma. The tissue sites included nine (9) skin biopsies and three (3) lymph nodes with metastatic melanoma.

Figure 3:
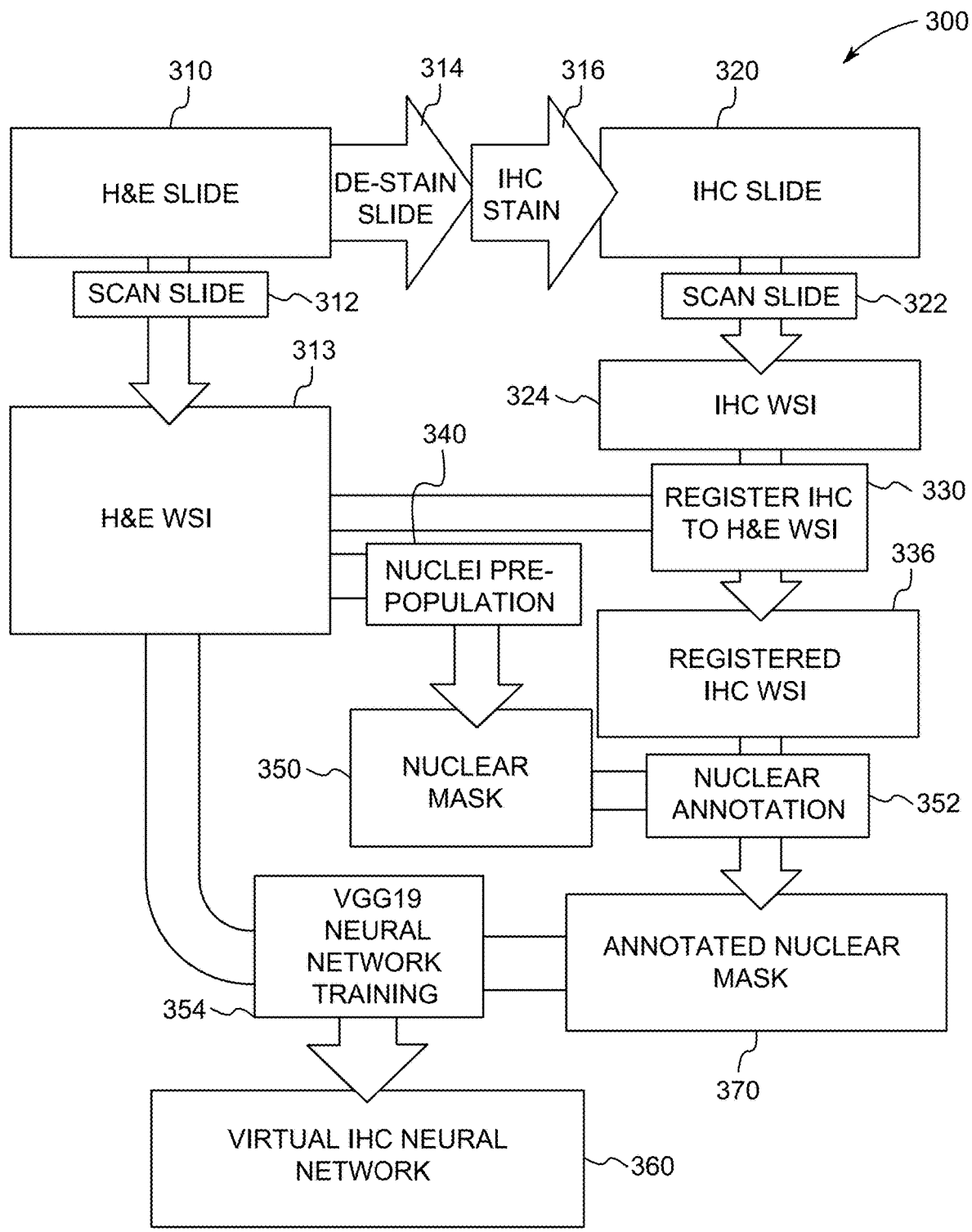
FIG. 3 is a flow diagram showing an overall procedure for generating a virtual IHC (vIHC) neural network (NN) for use in the system and method shown in FIGS. 1 and 2, according to an exemplary embodiment.

A diagram depicting the overall approach 300 to creating the vIHC is shown in FIG. 3. New tissue sections were cut from the corresponding blocks at 5 μm and stained with H&E using a routine processor (block 310). The resulting slides were scanned at 400× (312) using one of either the Leica Aperio AT2 or the Leica Aperio CS2 scanner (Buffalo Grove, IL, USA). This creates the H&E WSI 313. A washout process (314) was then applied to the tissue slides to remove the H&E stain, and the slides were re-stained (316) with SOX10 IHC (Leica, PA0813, pre-diluted) using automated techniques (Leica Bond; Leica Microsystems, Bannockburn, IL, USA) with appropriate controls. The resulting SOX10 IHC slides (block 320) were scanned (322) at 400× using the same Leica scanners as above. This creates the depicted IHC WSI 324.

i. Convolutional Neural Network Specifications

All CNNs were created using either a pre-trained VGG19 network or InceptionV3 (e.g.) using MATLAB R2018b, available from MathWorks of Natick, MA as version 9.5.0.944444. The networks were trained using a Titan Xp, available from NVidia, Santa Clara, CA, USA) graphics processing unit and a Ryzen Threadripper 1950X 16-Core CPU, available (e.g.) from Advanced Micro Devices (AMD) of Santa Clara, CA, USA. Each network was trained between 30 and 300 epochs in accordance with the procedures described below.

ii. Training Image Dataset Preparation

Referring further to FIG. 3, H&E and IHC WSIs 313, 324 in the NN-set were registered (block 330) in several steps. In order to use the IHC WSI to annotate cells from the H&E WSI, the images needed to be precisely registered so that corresponding nuclei overlapped from each image. In the exemplary implementation, the WSIs are typically too large to be registered in one step due to memory considerations, so registration is performed sequentially at various magnifications, similar to previously described method. See by way of background, Lotz J, Olesch J, Muller B, Polzin T, Galuschka P, Lotz J M, et al. Patch-Based Nonlinear Image Registration for Gigapixel Whole Slide Images. IEEE Trans Biomed Eng. 2016; 63: 1812-1819. Note that in alternate (e.g. academic, medical and/or commercial) implementations, sufficient computing power can be made available to omit some, or all, of the multiple steps employed in the present example. In the procedure 300, the WSIs 313, 324 are first coarsely-registered at low magnification. The coarsely-registered H&E and IHC images were then divided into 1,000×1,000-pixel sub-image (See Frame A in FIG. 4) for fine-registration. This generates the Registered IHC WSI (block 336).

A ground truth (nuclear) mask layer 350 is then created for each sub-image. The mask layer 350 is first pre-populated (block 340) with segmented nuclei using a seeding technique (described in Malon, CD, referenced above). In this method, a neural network is trained (block 354) to identify the center of a cell nucleus. Hence the above-described vIHC NN (block 360) is generated. The exemplary procedure ensures that overlapping nuclei are treated separately. Each nucleus in this nuclear-mask 350 is then annotated (block 352) as being SOX10-positive or negative based on the staining intensity of the same cell nucleus in the corresponding IHC image. This creates the annotated nuclear mask shown as block 370.

In prior experimental procedures, all H&E sub-images in the NN-set were compared to their corresponding IHC sub-images and annotated according to IHC positivity. It was noted, however, that large areas of the WSI did not contain any areas with SOX10 positive-melanocytes. In the present experimental procedure, as described herein, to avoid spending computational time annotating regions with no SOX10 positive cells, regions of interest were highlighted by a medical doctor, and only cells within these regions were compared to their corresponding IHC. All nuclei that were outside the regions of interest were automatically categorized as non-melanocytic. Non-melanocytic SOX10-positive cells were omitted from the regions of interest. However, it is expressly contemplated that regions of interest (ROIs) can be identified and bounded automatically by any acceptable, commercially available, pattern recognition/machine vision process (e.g. contrast tools, blob tools, etc.).

iii. Registration

In the exemplary procedure, only H&E and IHC sub-images in the NN-set that overlapped with the ROI undergo fine-registration, which is carried out in two sequential steps. The first step is a multimodal affine registration that allows for rotation, translation, scale change, and shearing. Again, various alignment tools can be employed to provide such results, including machine learning registration techniques. This registration step is followed by a non-rigid diffeomorphic technique (See Frame B in FIG. 4, and refer by way of background to the teaching in Szegedy C, Vanhoucke V, Ioffe S, Shlens J, Wojna Z. Rethinking the Inception Architecture for Computer Vision [Internet]. 2016 IEEE Conference on Computer Vision and Pattern Recognition (CVPR). 2016. doi:10.1109/cvpr.2016.308; and Lotz J, Olesch J, Muller B, Polzin T, Galuschka P, Lotz J M, et al. Patch-Based Nonlinear Image Registration for Gigapixel Whole Slide Images. IEEE Trans Biomed Eng. 2016; 63: 1812-1819.6. The ground truth mask nuclei in these areas are classified as either positive-or-negative for SOX10 depending the stain intensity of the corresponding registered SOX10 IHC sub-image (See Frame D in FIG. 4). This is achieved by applying thresholding techniques to the color channels of the registered IHC image.

Figure 4:
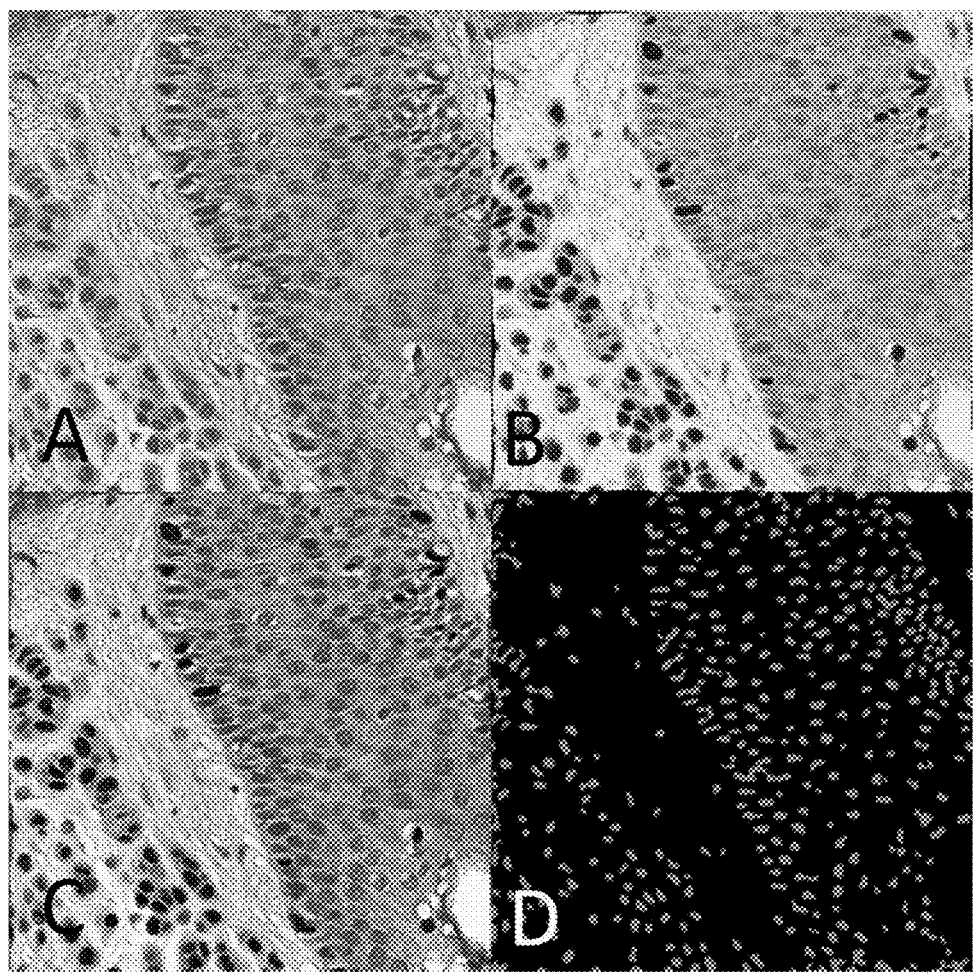
FIG. 4 is a diagram showing exemplary H&E sub-images with image Frames A-D which, in Frame A, the H&E sub-images are registered to their corresponding SOX10 immunohistochemistry sub-images, as shown in Frame B, and superimposed, as shown in Frame C to evaluate for quality of registration, and from which a ground-truth layer is then created from the H&E image, and the nuclei were categorized as either SOX10-positive (yellow), or SOX10-negative (green) using the corresponding immunohistochemistry sub-image, as shown in Frame D.

In the experimental procedure herein, the registered sub-images were overlaid and evaluated for registration quality by a medical doctor as shown in Frame C of FIG. 4. It is noted that some images had poor registration, despite efforts to fine-tune the registration parameters. A categorical CNN can be created to identify these poorly-registered images, and they can be removed from the dataset. To save on computational resources, all sub-images with less than 20 nuclei are also removed in this implementation (but can be retained, in whole or in part, in implementations with appropriate computing power). The NN-set is randomly split into a training-set (NN-training subset) that consists of 90% of the images, and a test-image set (NN-test subset) that consisted of the remaining 10% of the images. This NN-training subset is then used to create the SOX10 virtual IHC (vIHC) neural network (360 in FIG. 3) using a VGG19-segmentation CNN.

B. Evaluation

In operation, according to the-experimental procedure herein, the SOX10-vIHC network was first evaluated by processing the NN-test subset images. A MATLAB program was created to compare the output segmentation layer to the corresponding ground-truth mask. Raw vIHC output images were processed to distinguish individual nuclei. This was achieved by setting all areas with a combined SOX10 positive and negativity score<0.95 to 0. A connected-components analysis was then performed to delineate each nucleus. The mean SOX10 positivity-score and SOX10-negativity score for each segmented nucleus was computed, and the category with the largest score was recorded and compared to the ground truth category. The results for 20,000 melanocytes and 20,000 non-melanocytic cells were aggregated and used to calculate the true positive (TP), true negative (TN), false positive (FP), and false negative (FN) values. A cumulative density plot and a receiver operator curve were produced using these scores.

By way of further background, IHC is used in clinical practice by a pathologist to visually evaluate a lesion. To fully compare the vIHC and IHC, the two were directly compared graphically by a human dermatopathologist. This allowed for characterization of the cell populations that were over and-under called as SOX10-positive. An additional set of images was used for this purpose (IHC-test-set). See Table 1 below for a listing of image sets and relevant descriptions. Five H&E sub-images from a single case of inflamed melanoma were processed by the CNN. This case was chosen as it was not used in the training set. The five sub-images in the IHC-test-set contained areas of normal skin, an area of dysplastic junctional melanocytes, and frankly invasive melanoma interfacing with lymphocytic inflammation. In a manner similar to that described above, the H&E slides were scanned at 400× resolution. The slide was then de-stained, after which SOX10 IHC performed. vIHC was applied to the H&E WSI. To visualize the vIHC output, a color map was overlaid on top of the H&E image. The color map was scaled so that nuclei predicted to be SOX10-negative were green, while nuclei predicted to be SOX10-postive were red. The color map was directly compared to the SOX10 IHC.

A final set of images (Subjective-test-set) that consisted of a lymph node containing metastatic melanoma, three cases of primary melanoma, a benign nevus, and one case of basal cell carcinoma were also graphically evaluated. Due to limitations in cost, SOX10 IHC was not obtained directly on the same tissue layer, but the appropriate staining pattern was inferred by an experienced board-certified dermatopathologist based on either the diagnosis or SOX10 IHC performed on an adjacent tissue layer.

TABLE 1

Description of image-sets.

| Alias | Lesion types | Cases | Same-layer IHC | Description |
|---|---|---|---|---|
| NN-Set | Melanoma in-sit, malignant melanoma, metastatic melanoma, basal cell carcinoma, neuroma | 12 WSI | Yes | All H&E images with corresponding digital IHC masks; see Table 2 |
| NN-Training Subset | Subset of NN-Superset used to train the neural network | | | |
| NN-Testing Subset | Subset of NN-Superset used for quantitative analysis of the neural network | | | |
| IHC-Test-Set | 1 case of enflamed melanoma | 1 WSI | Yes | Image used for graphical evaluation of vIHC with direct comparison to IHC |
| Subjective-Test-Set | Invasive melanoma, metastatic melanoma, basal cell carcinoma | 5 WSI | No | Graphical evaluation of vIHC using H&E only |

Hematoxylin and eosin: H&E; Immunohistochemistry: IHC; Neural network: NN; Whole slide image: WSI.

C. Results i. Immunohistochemistry Training-Set

SOX10 IHC highlighted multiple cell populations within each specimen. Nuclear staining was present in all benign and malignant melanocytes, as well as Schwann cells, and the myoepithelial cells of eccrine glands. One case with a neuroma had SOX10 positivity within the neoplasm. For the data shown in here, only regions that contained SOX10 positive melanocytes were highlighted as regions of interest, and non-melanocytic SOX10 positive cells were purposefully excluded.

ii. Registration

The total number of sub-images, the number of well-registered sub-images with more than 20 nuclei, and the number of corresponding melanocytic and non-melanocytic cells for each WSI in the NN-set are shown in Table 2. The NN-set consisted of 18,122 well-registered images, and these were randomly split into the NN-training set consisting of 16,309 images, and a NN-test set that consisted of 1,813 sub-images.

TABLE 2

Histopathologic characteristics of the NN-set.

| | | | Pre-quality check Sub-images | Post-quality check, sub-images with >20 nuclei | | | | |
|---|---|---|---|---|---|---|---|---|
| | | | | | Number of cells | | | |
| Case | Location | Lesion type | | Sub-images | SOX10 positive | SOX10 negative | Percent SOX10 positive | Cell fraction of dataset |
| 1 | Skin | MIS | 3246 | 1987 | 654 | 317261 | 0.2% | 8.4% |
| 2 | Skin | MIS | 1906 | 1290 | 594 | 187875 | 0.3% | 5.0% |
| 3 | Skin | Melanoma | 3379 | 2168 | 19142 | 336058 | 5.4% | 9.4% |
| 4 | Skin | Melanoma | 3409 | 2004 | 19551 | 264744 | 6.9% | 7.5% |
| 5 | Skin | BCC | 306 | 260 | 1051 | 58222 | 1.8% | 1.6% |
| 6 | Skin | Melanoma | 1069 | 975 | 25493 | 167175 | 13.2% | 5.1% |
| 7 | Skin | Neuroma | 483 | 361 | 556 | 66314 | 0.8% | 1.8% |
| 8 | Skin | Melanoma | 753 | 488 | 31210 | 99420 | 23.9% | 3.4% |
| 9 | LN | MM | 3735 | 2796 | 18402 | 661343 | 2.7% | 17.9% |
| 10 | LN | MM | 3743 | 2249 | 61901 | 623796 | 9.0% | 18.1% |
| 11 | Skin | Melanoma | 1250 | 768 | 10964 | 91754 | 10.7% | 2.7% |
| 12 | LN | MM | 4373 | 2776 | 116648 | 522706 | 18.2% | 16.9% |
| Total | | | 27,652 | 18,122 | 306,166 | 3,396,668 | 8.3% | 100% |

BCC: Basal cell carcinoma;
LN: Lymph node;
MIS: Melanoma in-situ;
MM: Metastatic melanoma.

Figure 5:
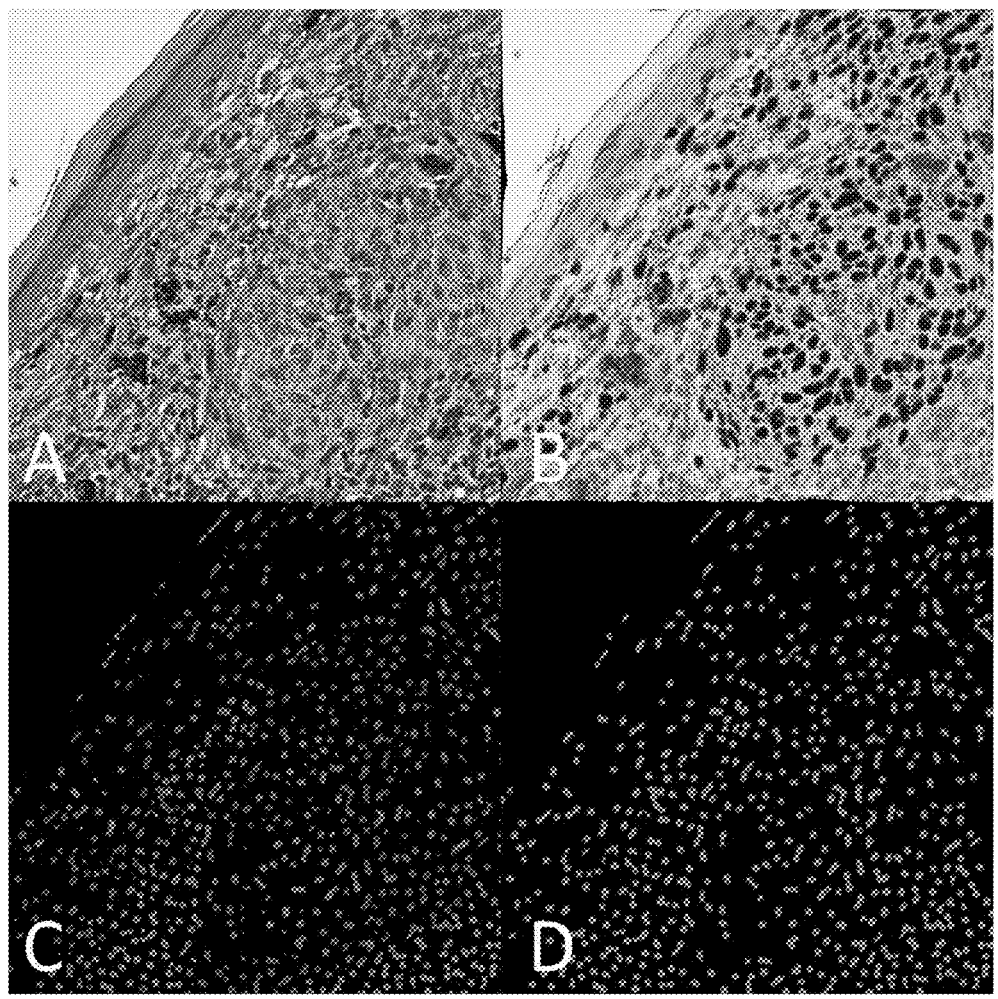
FIG. 5 is a diagram showing an exemplary NN-test image set with associated image Frames A-D, in which Frame A is an H&E image of melanoma in a tissue section of skin, Frame B is a corresponding IHC, Frame C is a raw vIHC output, and Frame D is a corresponding (e.g.) color map where nuclei are colored depending on their true SOX10 IHC and predicted vIHC positivity.
Figure 6:
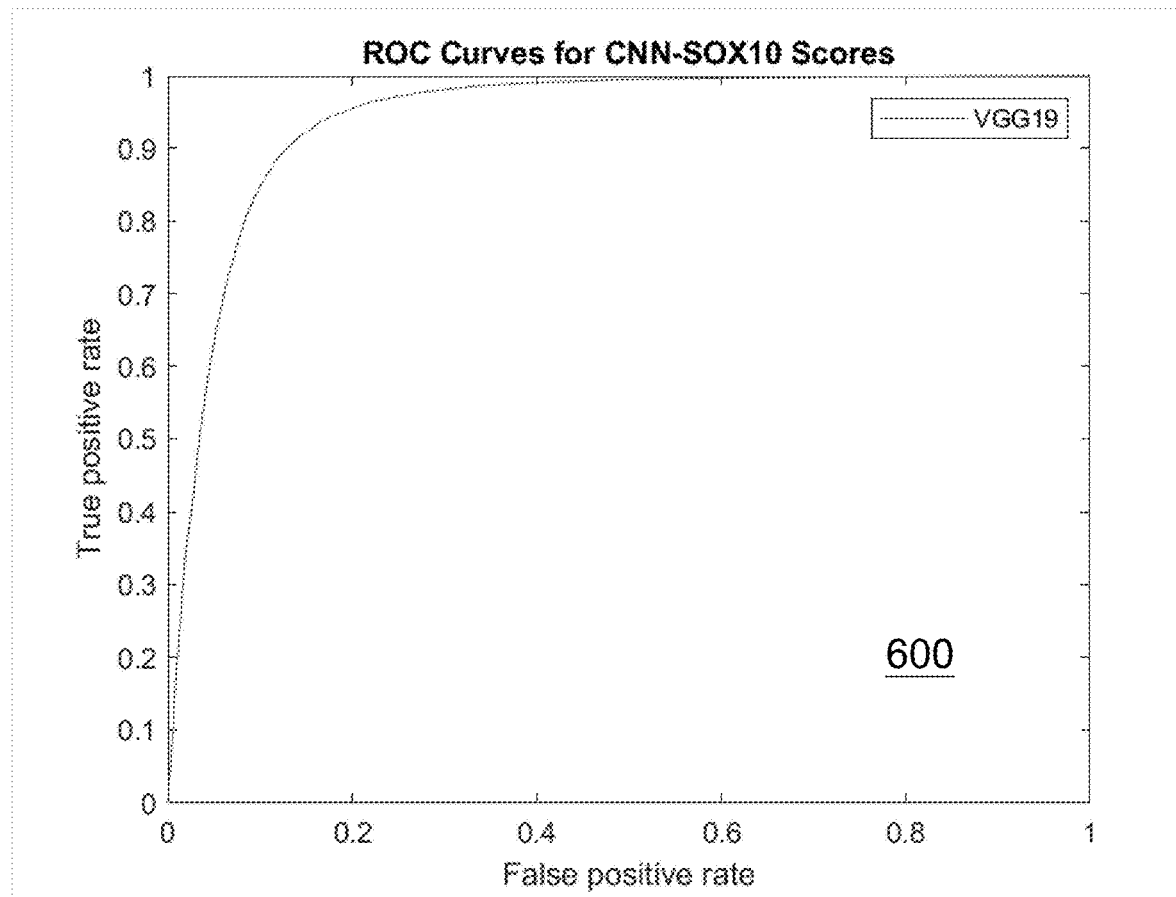
FIG. 6 is a graph showing an exemplary Receiver Operator Curve for the SOX10 vIHC according to the exemplary embodiment, plotting True Positive (TP) Rate versus False Positive (FP) Rate.
Figure 7:
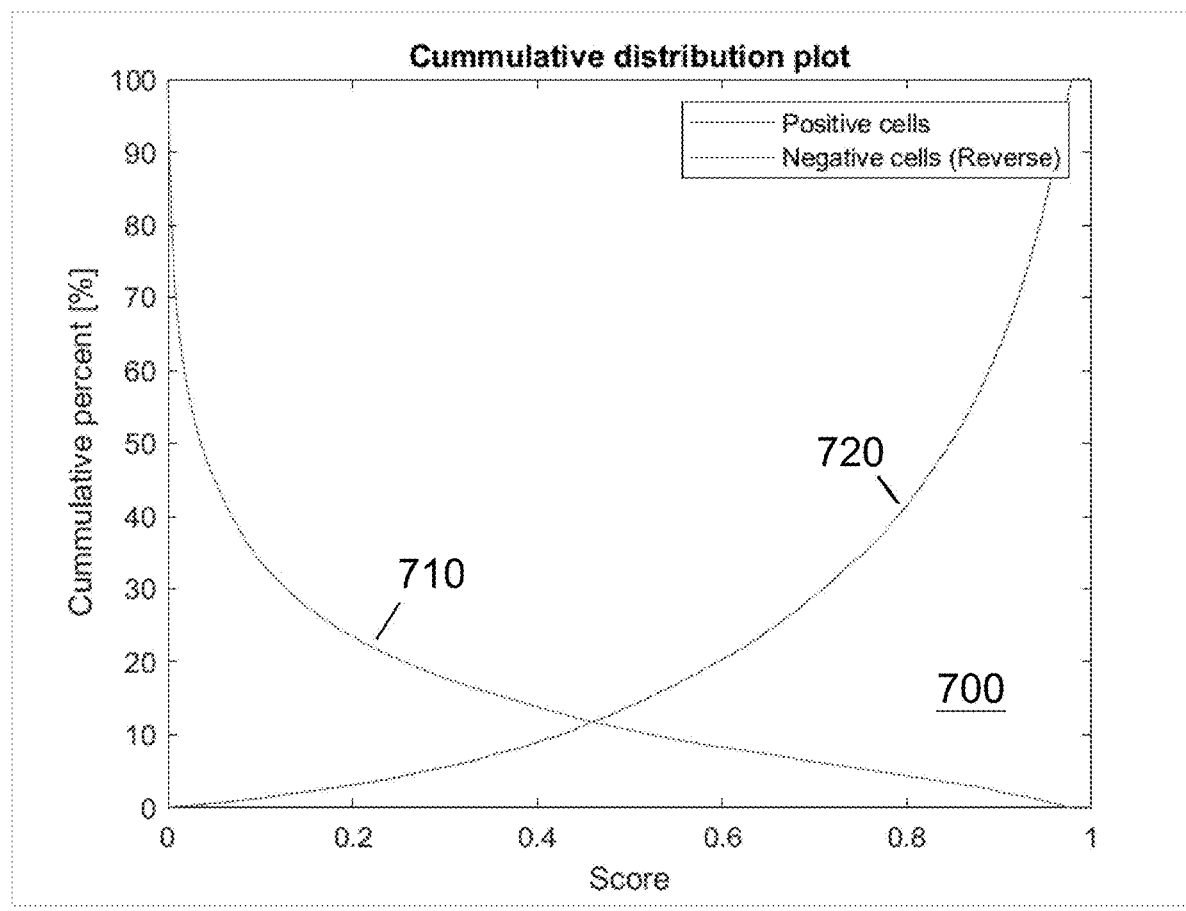
FIG. 7 is a graph showing a plot of Cumulative Distribution (percent) versus the average Positivity Score for the cell nuclei within the test image set according to the exemplary embodiment.

The average SOX10 vIHC positivity-and-negativity scores were calculated for every nucleus in the testing-set. The TP and TN values were calculated by comparing the ground truth category of each nucleus to the scores computed by the vIHC network. This is further depicted in FIG. 5, showing an example image from the experimental NN-test set. Frame A is an exemplary H&E image of melanoma in a tissue section of skin (H&E, 400× magnification). Frame B is a corresponding IHC (SOX10, 400× magnification); Frame C is a raw vIHC output, where the green color channel is scaled to the SOX10-negativity score, and the (contrasting) red color channel is scaled to the SOX-10-positivity score. A strongly red (or another appropriate color) nucleus is predicted to be SOX-10 positive, while a strongly green (or another appropriate contrasting color) nucleus is predicted to be SOX-10 negative. Frame D is a corresponding color map where nuclei are colored depending on their true SOX10 IHC and predicted vIHC positivity. True-positives are colored red (or another appropriate color), true-negatives are colored green (or another appropriate color), false-negatives are colored blue (or another appropriate color), and false positives are colored and pink (or another appropriate color). Note that alternate indicia (instead of or in addition to, color), such as grayscale shading, dot shading and/or line shading, can be used to distinguish different types of tissue/cells. A receiver operator curve of True Positive (TP) Rate versus False Positive (FP) Rate was computed (graph 600 in FIG. 6), and the area under the curve was 0.9422. The resulting, depicted, TP and TN rates are 91.62% and 85.66% respectively at the optimal point on the ROC curve which was a score of 0.3868. The resulting cumulative distribution plot 700 is shown in FIG. 7.

iii. Graphical Evaluation

Figure 8:
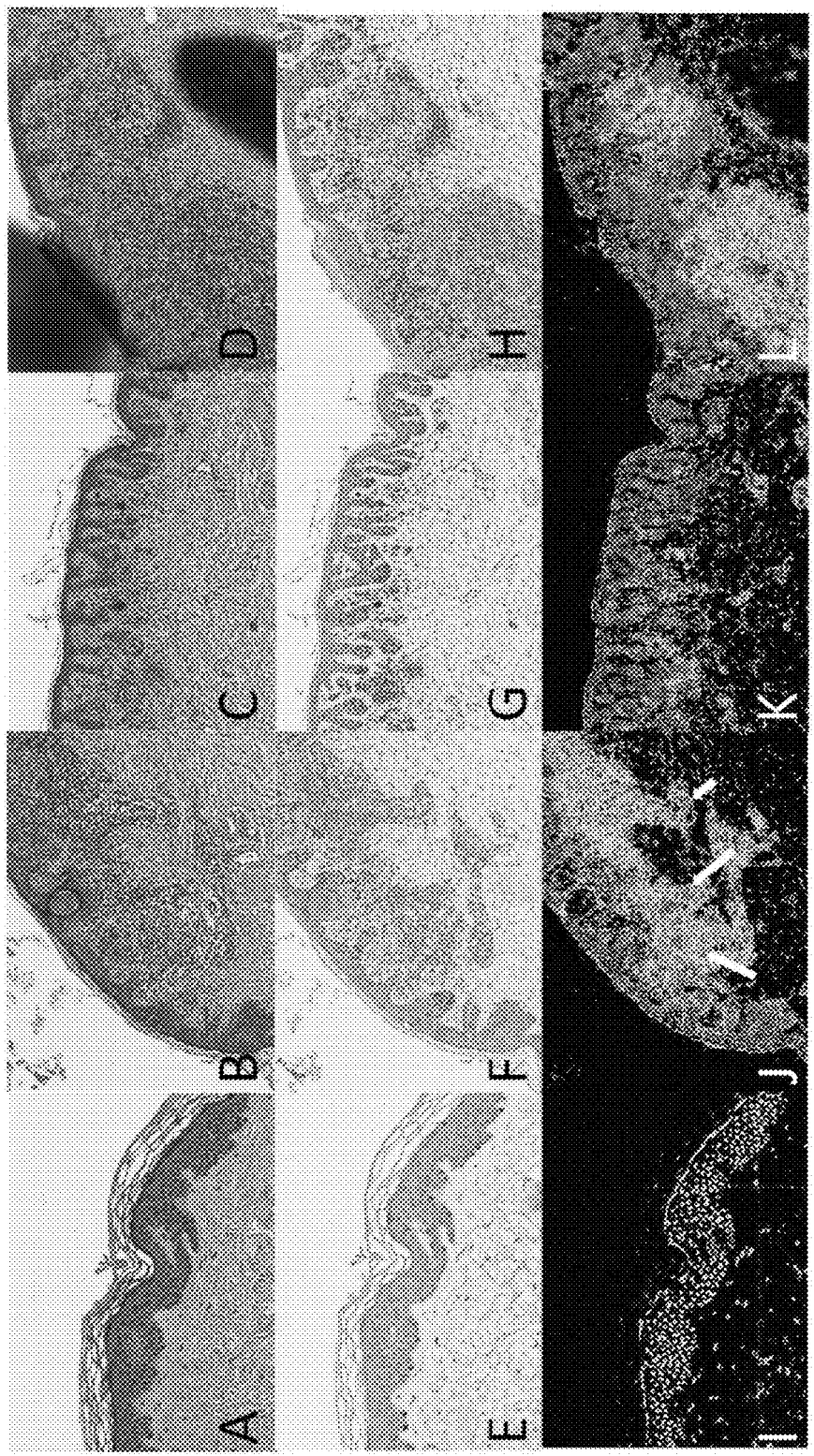
FIG. 8 is a diagram showing exemplary H&E test images in (top row, image Frames A-D) along with their corresponding SOX10 immunohistochemistry (middle row, image Frames E-H) and the SOX10 vIHC output (bottom row, image Frames I-L), in which Frames A, E and I depict normal skin, Frames B, F, J, depict lymphocytic inflammation of the superficial dermis, Frames C, G, K depict nests of dysplastic melanocytes, and Frames D, H, L depict inflamed invasive melanoma.

The five sub-images from the IHC-test-set were evaluated (See FIG. 8). SOX10 IHC highlighted several cell populations in the IHC-test-set images. Benign melanocytes, dysplastic melanocytes, and malignant melanocytes within the melanoma were all highlighted. More particularly, FIG. 8 is a diagram showing exemplary H&E test images in (top row, image Frames A-D) along with their corresponding SOX10 immunohistochemistry (middle row, image Frames E-H) and the SOX10 vIHC output (bottom row, image Frames I-L), in which Frames A, E and I depict normal skin, Frames B, F, J, depict lymphocytic inflammation of the superficial dermis, Frames C, G, K depict nests of dysplastic melanocytes, and Frames D, H, L depict inflamed invasive melanoma. Note that in this exemplary operation, lymphocytes, which are erroneously labelled as melanocytes by the CNN, are indicated with white arrows. Further training and refinement of the overall process can help to eliminate such errors in an operation embodiment.

The resulting vIHC is compared to the SOX10 IHC stain performed on the same cell layer. The CNN subjectively highlighted most of the malignant melanoma cells, and appropriately did not highlight most of the inflammatory infiltrates interfacing with the lesion. Nests of dysplastic melanocytes were also appropriately highlighted. The SOX10 vIHC was comparable to the IHC in areas of malignant melanoma, nested melanocytes, and in normal skin, as assessed by an experienced board-certified dermatopathologist. The vIHC effectively highlighted several foci of lymphocytes as well as rare keratinocytes (See, in FIG. 8, Frames I and J). As noted above, rarely, melanoma cells have been improperly classified as non-melanocytic using the vIHC of the exemplary embodiment.

Figure 9:
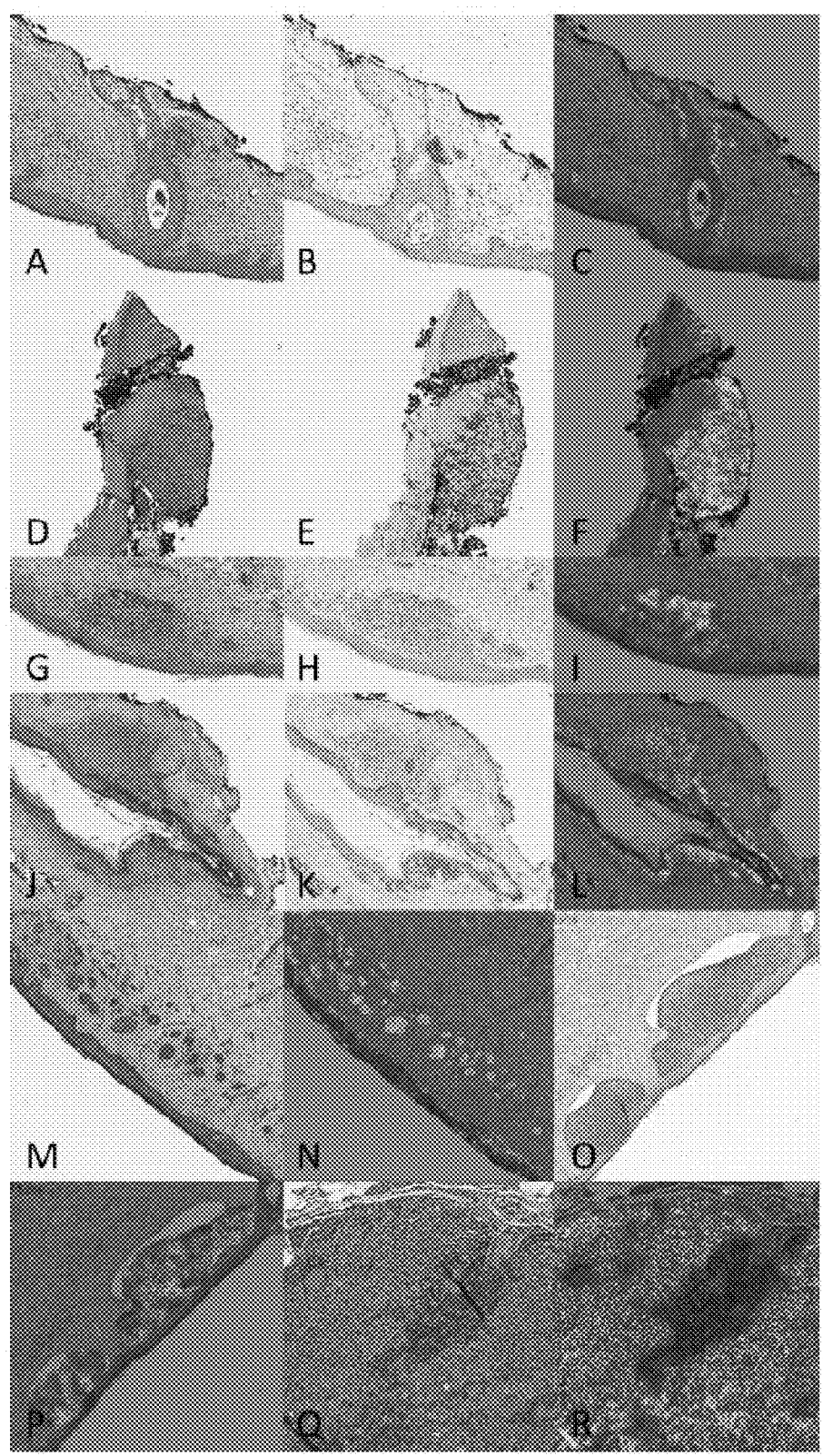
FIG. 9 is an exemplary diagram of representative images from the Subjective-test set with image frames A-R, described in detail below.

In experimental operations, the vIHC of the present embodiment is also applied to the images in the Subjective-test set, wherein IHC is performed on an adjacent tissue later or was inferred based on the diagnosis. These images include primary melanomas, a metastatic melanoma, a nevus, and basal cell carcinoma. Most metastatic melanoma cells in the lymph node are appropriately classified as melanocytic. FIG. 9 more particularly shows FIG. 9 representative images from the Subjective-test set. The images depicting vIHC are created by superimposing the SOX10-positive scores and the H&E images to ensure a high contrast is achieved. Image Frame A is a minute focus of malignant melanoma abutting a hair follicle (H&E, 400×) with the corresponding SOX-10 IHC (Image Frame B) and SOX10 vIHC (Image Frame C). Depicted image Frame D is a large focus of malignant melanoma transected at the base (H&E, 400×), with the corresponding SOX-10 IHC (image Frame E) and SOX10 vIHC (image Frame F). Image Frame J shows a different region of the same lesion as image Frames G-I, with SOX10 positivity (H&E, 400×), with the corresponding SOX-10 IHC (image Frame K) and SOX10 vIHC (image Frame L). Image Frame M shows multiple nodules of melanoma (H&E, 400×) with corresponding vIHC (image Frame N). Depicted image Frame O shows basal cell carcinoma (H&E, 400×) with corresponding vIHC (image Frame P). Depicted image Frame Q shows metastatic melanoma within a lymph node (H&E, 400×) with corresponding vIHC (image Frame R). Notably, variable results are obtained in some of the primary melanomas which should have been uniformly positive. Note that the basal cell carcinoma, which is expected to have only scattered SOX10 positivity due to the presence of benign melanocytes within the lesion, is erroneously predicted to be diffusely SOX10 positive (See FIG. 9, image Frames O-P). Again, such errors can be reduced through further training and refinement of the process in an operational embodiment.

II. Further Considerations

In various embodiments, a segmentation network capable of distinguishing melanocytes from other cells can be created using SOX10 IHC. Cell-specific segmentation is achieved using partially-supervised machine learning in the exemplary embodiment of the system and method. Also, in order for the individual cells to be labelled appropriately, the nuclei in the H&E and corresponding IHC images required a high degree of overlap. Achieving this degree of overlap can be challenging given the size of the WSI which can be in excess of 40,000×40,000 pixels. Registering such large images demands a low tolerance for error on the order of 0.02%. This margin for error is significantly smaller than that seen in other manipulations of high-resolution images. Registering satellite images, for example, deals with large images, but does not undergo a similarly high degree of warping. See Serief C, Bentoutou Y, Barkat M. Automatic Registration of Satellite Images [Internet]. 2009 First International Conference on Advances in Satellite and Space Communications. 2009. doi:10.1109/spacomm.2009.19. Likewise, for various imaging modalities in conventional medical imaging such as MRI and CT scans, the two dimensional image sizes are significantly smaller than those of WSIs, and the relative tolerance required for the method to be useful is much higher. See Dean C J, Sykes J R, Cooper R A, Hatfield P, Carey B, Swift S, et al. An evaluation of four CT-MRI co-registration techniques for radiotherapy treatment planning of prone rectal cancer patients [Internet]. The British Journal of Radiology. 2012. pp. 61-68. doi:10.1259/bjr/11855927. In smaller-scale computing environments H&E and IHC WSIs may be too large to be simultaneously loaded into our RAM at the same time. Previous studies that registered H&E and IHC from serial tissue sections were likewise not as spatially precise because they aimed only to correlate areas of tissue and not individual cells. Multiple registration steps at various magnifications, using both rigid and non-rigid registration techniques, was essential to achieving a high degree of overlap. This method nevertheless resulted in poor nuclear overlap in 34.5% of images in the NN-set. In some embodiments, the step of manually registering the images can be employed to overcome disadvantages. As described above, further training and refinement can be expected to improve performance, as can the use of resources of larger academic and commercial computing environments.

The above-described experimental procedure yielded certain unexpected positive results. Due to the significant differences in tumor microenvironment between skin and lymph node, one could expect that a CNN trained largely on skin samples would perform poorly when tested on lymph nodes images. However, this was not the case: the CNN reliably and correctly identified melanoma metastases within a case of melanoma that had metastasized to a lymph node, and did not mislabel significant numbers of other cells. Future work could examine the network's ability to identify melanoma metastasis in a wide variety of tissues.

The sensitivity and specificity achieved by the experimental procedure were much higher than those that were reported by a similar approach that used phosphohistone-H3 to detect mitotic figures. This may be partially attributed to the use of a rigorous automated-registration protocol that removed poorly registered images from the data-set. The sensitivity in obtained from our procedure was comparable that reported by other work that investigated cytokeratin immunofluorescence, however the specificity was lower. There are several factors that may have contributed to this difference. Some can be related to biology; melanocyte morphology is notoriously varied when compared to other tumors, including the cytokeratin-positive pancreatic carcinoma cells examined in previous work. In our study, the NN-set consisted of multiple lesion types and tissue types. Such diversity may have improved generalizability, but at the cost of some accuracy.

III. Operational Implementations

It is contemplated that the analysis provided by the system and method herein can be made available to practitioners and other interested parties via a number or channels of communication and trade. For example, users can create stained slides at remote sites or those with limited resources, capture images using widely available equipment, and download such data (e.g. via the Internet or physical storage media—thumbdrives, etc.) to a subscription site that performs the analysis using the vIHC described herein. User data received can also be used to further train and expand the vIHC under certain circumstances. The analysis can be delivered to the user via a secure communication channel for review and study by the user. Costs can be borne by users through one-time fees, subscriptions or membership in a not-for-profit arrangement. The vIHC and associated processes can be instantiated on institutional computers—for example a large hospital system or governmental agency for access by associated practitioners. More generally, the system and method ca be made available as an online software package to be loaded onto a user's own computing platform.

IV. Conclusion

Conventional IHC is expensive, labor-intensive, time-consuming, and can waste precious tissue in small biopsy samples. Nevertheless, the diagnostic information provided by IHC can be extremely useful, and is indispensable in some cases. A rapid and inexpensive method to accurately obtain the same information, according to the system and method herein, provides numerous benefits for both research and clinical care. The system and method herein allows immunohistochemical data with cell-specific resolution to be obtained using artificial intelligence, with clear advantages in terms of time, labor, and cost are clear. Initial experimental results using the system and method indicate that vIHC with good-quality accuracy can be achieved. Moreover, the system and method generally supports an inexpensive, rapid, accurate tool, capable of yielding indispensable diagnostic information, could become widely used in the diagnosis of patients with cancer or other diseases.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, where a graphical representation of the output data is provided, such representation should not be limited to histologic images, but can also include a statistical representation of the data according to any acceptable format. Additionally, while the non-IHC stain used, in a first preparation herein, is typically H&E, it is expressly contemplated that any appropriate non-IHC stain (or a plurality for such stains) can be used as the second preparation in each slide. This second preparation can include, but is not limited to, at least one of Dif Quik, Romanowsky stain, Papanicolaou stain, Periodic Acid Schiff, Gram stain, Trichrome stain, Coloidal Iron, and/or Sudan Black. Also, as used herein, the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. A system for providing a diagnostic companion for diagnosing conditions based upon microscopic analysis of cells in tissue sample slides comprising:
   a processor acquiring a first set of images of a plurality of tissue sample slides prepared by a first preparation technique of at least two preparation techniques, and acquiring a second set of images of the plurality of tissue sample slides prepared by a second preparation technique of the at least two preparation techniques;

the processor applying color filters and machine learning-based image transformations to pair a first image of a first tissue sample of the first set of images with a second image of the first tissue sample of the second set of images;

the processor coarsely registering the pair of images, dividing at least the first image of the pair into one or more sub-images each comprising a subset of the first image, finely registering the pair of images based on at least one of the one or more sub-images, and creating a first preparation technique mask for the at least one of the one or more sub-images;

the processor configuring a training image set based on a mask derived from images of a plurality of the tissue sample slides acquired using each of the at least two preparation techniques;

the processor deriving the mask by annotating the first preparation technique mask based on a stain-analysis of the corresponding image of the pair; and the processor training a neural network based on the training image set.

2. The system as set forth in claim 1 wherein the at least two preparation techniques comprise H&E staining and IHC.

3. The system as set forth in claim 2, further comprising, a segmentation process that divides each of the images into regions of interest.

4. The system as set forth in claim 3, further comprising, a registration process that aligns image features in an image from the IHC technique (the IHC image) to an image from the H&E technique (the H&E image) in the same tissue sample.

5. The system as set forth in claim 4, further comprising, a mask layer that identifies a center of at least one nuclei, wherein the mask layer is generated by applying one or more of stain-intensity color-thresholding, computational analysis, or machine learning techniques to color channels of the corresponding registered IHC image.

6. The system as set forth in claim 5, further comprising, an annotated version of the H&E image that is generated via the mask layer to create sub images that comprise training set images.

7. The system as set forth in claim 6 further comprising a training process that trains the neural network using the training set so as to predict IHC cellular staining.

8. The system as set forth in claim 7 wherein the neural network comprises one of a convolutional neural network, a VGG19-based neural network and InceptionV3-based neural network.

9. The system as set forth in claim 7, further comprising a user interface that enables a user to provide a stained slide with a tissue sample for analysis and provision of diagnostic results by applying the neural network during runtime.

10. The system as set forth in claim 9 wherein the user interface is associated with a remote network architecture that enables long distance input to, and receipt of results by, the user.

11. The system as set forth in claim 10 wherein the results include at least one of color-coding, graphics, statistical, and textual information.

12. The system as set forth in claim 11 wherein the neural network is associated with a remote computing device with which the user is associated by at least one of a subscription, payment arrangement or organizational membership and the interface includes an identification process to validate the user.

13. The system as set forth in claim 1 wherein the at least two preparations include IHC or a special stain selected from a group comprising Periodic Acid Schiff, Gram stain, Trichrome stain, Colloidal Iron, Sudan Black, and any other special stain, and at least one non-IHC stain selected from a group consisting of H&E, Dif Quik, Romanowsky stain, Papanicolaou stain, or any other specialized non-IHC stain.

14. The system as set forth in claim 13, further comprising, a de-staining and application process that de-stains the non-IHC stain and applies IHC to the same slide.

15. The system of claim 9, wherein the provision of diagnostic results is based upon operation of the system of claim 1.

16. A method for providing a diagnostic companion for diagnosing conditions based upon microscopic analysis of cells in tissue sample slides comprising:

acquiring a first set of images of a plurality of tissue sample slides prepared by a first preparation technique of at least two preparation techniques;

acquiring a second set of images of the plurality of tissue sample slides prepared by a second preparation technique of the at least two preparation techniques;

applying color filters and machine learning-based image transformations to pair a first image of a first tissue sample slide in the first set of images with a corresponding second image of the first tissue sample slide in the second set of images;

coarsely registering the pair of images, dividing at least the first image of the pair into one or more sub-images each comprising a subset of the first image, finely registering the pair of images based on at least one of the one or more sub-images, and creating a first preparation technique mask for the at least one of the one or more sub-images;

deriving a mask by annotating the first preparation technique mask based on a stain-analysis of the corresponding second image of the pair;

deriving a training image set by processing the mask and at least a portion of one or more of the first set of images and the second set of images; and training a neural network based upon the training image set.

17. The method as set forth in claim 16 wherein the at least two preparation techniques comprise H&E staining and IHC.

18. The method as set forth in claim 17, further comprising, dividing each of the images into regions of interest.

19. The method as set forth in claim 18 further comprising a registration process that aligns image features in an image from the IHC technique (the IHC image) to an image from the H&E technique (the H&E image) in the same tissue sample.

20. The method as set forth in claim 19, further comprising a training process that trains the neural network using the training set so as to predict IHC cellular staining.

* * * * *